United States Patent
Taniguchi et al.

(10) Patent No.: US 10,910,902 B2
(45) Date of Patent: Feb. 2, 2021

(54) ROTARY ELECTRIC MACHINE

(71) Applicant: DENSO CORPORATION, Kariya (JP)

(72) Inventors: Makoto Taniguchi, Kariya (JP); Akira Fukushima, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/546,405

(22) Filed: Aug. 21, 2019

(65) Prior Publication Data

US 2019/0379252 A1 Dec. 12, 2019

Related U.S. Application Data

(63) Continuation of application No. PCT/JP2018/004491, filed on Feb. 8, 2018.

(30) Foreign Application Priority Data

Feb. 21, 2017 (JP) ................. 2017-030042

(51) Int. Cl.
| | |
|---|---|
| *H02K 21/12* | (2006.01) |
| *H02K 3/42* | (2006.01) |
| *H02K 1/02* | (2006.01) |
| *H02K 1/16* | (2006.01) |
| *H02K 1/27* | (2006.01) |
| *H02K 21/14* | (2006.01) |

(52) U.S. Cl.
CPC .............. *H02K 3/42* (2013.01); *H02K 1/02* (2013.01); *H02K 1/16* (2013.01); *H02K 1/276* (2013.01); *H02K 21/14* (2013.01)

(58) Field of Classification Search
CPC H02K 1/148; H02K 1/02; H02K 3/42; H02K 1/16; H02K 1/276; H02K 21/14
See application file for complete search history.

(56) References Cited

U.S. PATENT DOCUMENTS

| | | | |
|---|---|---|---|
| 7,567,010 B1* | 7/2009 | Farnia | H02K 1/148 310/216.067 |
| 2007/0222306 A1* | 9/2007 | Hultman | H02K 15/022 310/44 |
| 2007/0252471 A1* | 11/2007 | Holmes | H02K 1/148 310/216.064 |
| 2011/0101818 A1* | 5/2011 | Lokhandwalla | H02K 1/148 310/216.098 |

FOREIGN PATENT DOCUMENTS

| | | |
|---|---|---|
| JP | 2001-69705 A | 3/2001 |
| JP | 2005-143237 A | 6/2005 |
| JP | 2006-254561 A | 9/2006 |
| JP | 2007-82276 A | 3/2007 |
| JP | 2008-61319 A | 3/2008 |
| JP | 2008-086059 A | 4/2008 |
| JP | 2008-295203 A | 12/2008 |
| JP | 2011-193573 A | 9/2011 |

OTHER PUBLICATIONS

Apr. 17, 2018 Search Report issued in International Patent Application No. PCT/JP2018/004491.

* cited by examiner

*Primary Examiner* — Thanh Lam
(74) *Attorney, Agent, or Firm* — Oliff PLC

(57) ABSTRACT

In a rotary electric machine, each of teeth of a stator core is provided with a covering portion. The covering portion of each of the teeth is made of a soft magnetic material having a lower iron loss factor than each steel plate. The covering portion of each of the teeth covers at least a part of a surface of the corresponding one of the teeth.

10 Claims, 9 Drawing Sheets

FIG.4A
TIME t1

FIG.4B
TIME t2

ROTARY ELECTRIC MACHINE

CROSS-REFERENCE TO RELATED APPLICATION

The present application is a continuation application of International Application No. PCT/JP2018/004491, filed on Feb. 8, 2018, which claims priority to Japanese Patent Application No. 2017-030042, filed on Feb. 21, 2017. The contents of these applications are incorporated herein by reference in their entirety.

BACKGROUND

Technical Field

The present disclosure relates to a rotary electric machine.

Background Art

As a part of a magnetic material forming a main magnetic circuit, a harmonic magnetic flux suppressing element for suppressing passage of alternating magnetic flux having harmonics equal to or higher than a predetermined cut-off frequency is provided.

SUMMARY

In a rotary electric machine, each of teeth of a stator core is provided with a covering portion. The covering portion of each of the teeth is made of a soft magnetic material having a lower iron loss factor than each steel plate. The covering portion of each of the teeth covers at least a part of a surface of the corresponding one of the teeth.

BRIEF DESCRIPTION OF THE DRAWINGS

The above-described objects, other objects, features, and advantages of the present disclosure will become more apparent from the following detailed description with reference to the accompanying drawings.

DETAILED DESCRIPTION OF THE PREFERRED EMBODIMENTS

In rotary electric machines, losses of electromagnetic machines mainly include copper loss generated by flowing of electric current through a stator copper wire and iron loss generated by passage of AC magnetic flux through iron cores of a stator and a rotor. In order to reduce the copper loss, coils, each of which is comprised of a wire having a substantially square cross-sectional area, are distributedly wound in slots of the iron core while (1) Portions of the coils wound in each coil are aligned with each other (2) Axial ends of the coils are geometrically shaped to be non-interfered with each other to thereby eliminate waste wires Meanwhile, in order to reduce the iron loss, as an iron core material, a material having as small an iron loss factor as possible while relieving magnetic flux saturation as much as possible is used. For example, there is known a rotary electric machine including an iron core molded by a magnetic powder material; the magnetic power material is comprised of iron-silicon-based alloy particles, each of which has a small iron factor, and an insulation layer covering the iron-silicon-based alloy particles.

When the magnetic powder materials each having a small iron loss factor are used as an iron core material, the saturated magnetic flux density is small. This may result in a magnetic path cross-section area being so large as to pass necessary magnetic flux therethrough. This may cause an increase in size of the machine.

Recent inverter-driven machines are each configured such that the waveform of an energization current is shaped based on a high switching frequency to thereby reduce a distortion factor of the energization current to its minimum limit. This may cause ultra-high frequency iron loss to be generated on the surface of the iron core due to minutely fluctuating magnetic flux synchronized with the switching frequency.

For example, Patent Literature 1 shows a configuration in which as a part of a magnetic material forming a main magnetic circuit, a harmonic magnetic flux suppressing element for suppressing passage of alternating magnetic flux having harmonics equal to or higher than a predetermined cut-off frequency is provided. The harmonic magnetic flux suppressing element is composed of a magnetic material that is more likely to generate iron loss compared with the other portion of the magnetic material forming the main magnetic circuit, and ultra-high frequency iron loss is prevented by concentrating energy of the harmonic component on the harmonic magnetic flux suppressing element and consuming the energy as heat generation in the harmonic magnetic flux suppressing element.

[PTL 1] JP 2008-295203 A

With the technology of Patent Literature 1, the ultra-high frequency magnetic flux like a switching frequency can be cut off, but removal of the harmonic magnetic flux lower than the switching frequency is thought to be difficult. That is, since the switching frequency has a limitation, it is difficult to shape the energization current into a sufficiently clean sine wave and therefore a harmonic magnetic flux that is lower than the switching frequency but has a frequency several times the basic frequency may be generated, and removal of the harmonic magnetic flux is difficult. In addition, in driving of a rotary electric machine with jointly used reluctance torque, in recent years, a spatial magnetic flux due to a rotation magnetic field generated by the stator is modulated by a shape of the rotor, and a harmonic magnetic flux equal to or higher than the harmonic component included in the current is likely to be generated. In such an actual condition, there may be room for improvement.

Note that, also in a rotary electric machine in which full-wave rectification by diodes is performed, such as a vehicle alternator, a harmonic component due to current waveform distortion in a low power factor region is regarded as a problem.

The present disclosure has been made in view of the above problem and has a main object to provide a rotary electric machine capable of efficiently reducing iron loss while avoiding increase in size of a device.

Means for solving the problem and working effects thereof will be described below.

A first means includes:

a rotor that is rotatably supported, and includes a plurality of magnetic pole portions in a circumferential direction thereof; and a stator that is coaxially arranged with the rotor and includes a stator core including a stator winding wound in the stator core, a multi-phase alternating current being supplied to flow through the stator winding, wherein:

the stator core is configured based on a plurality of laminated steel plates and includes an annular yoke and a plurality of teeth extending in a radial direction from the yoke, the stator winding is configured such that a conductor is distributedly wound in the stator core for each of the magnetic pole portions, each of the teeth is provided with a covering portion, and the covering portion of each of the teeth is made of a soft magnetic material having a lower iron loss factor than each steel plate, the covering portion of each of the teeth covering at least a part of a surface of the corresponding one of the teeth.

With the above configuration, at least a part of a surface of each of the teeth in the stator core is covered with the covering portion made of a soft magnetic material having a lower iron loss factor than the steel plate, in other words, covering with a soft magnetic material having a low iron loss factor is performed only on a surface portion of each of the teeth in which iron loss is easily generated in the stator core. In this case, it is possible to efficiently reduce the iron loss, particularly eddy-current loss without interfering with a main magnetic flux of the rotor and/or a reaction magnetic flux of the stator winding. In addition, increase in size of the stator core can be suppressed compared with a case of forming an entire stator core by using a low iron loss material. As a result, it is possible to efficiently reduce the iron loss while avoiding increase in size of a device.

In a second means, each of the teeth has a facing surface facing the rotor; and each of the covering portions is configured to cover at least a part of the facing surface of the corresponding one of the teeth.

Since the covering portion made of a soft magnetic material having a low iron loss factor is provided on the facing surface facing the rotor in each of the teeth, iron loss reduction of the AC magnetic flux passing through between a tooth tip portion and the rotor facing each other in the radial direction can be suitably achieved.

In a third means, the stator core has gaps each provided between a corresponding adjacent pair of the teeth, each gap being located at respective ends of the teeth of the corresponding pair;

each of the teeth has a facing surface facing the rotor; and each of the covering portions is configured to cover at least a part of the facing surface of the corresponding one of the teeth.

In a rotary electric machine in which a gap is provided between adjacent teeth on tip sides of the teeth on an opposite side of the yoke of the stator core, when a magnetic flux enters or leaves the stator core while rotating, a magnetic resistance changes according to a positional relation between a magnetic pole portion and the teeth. This generates unevenness of spatial magnetic flux in the vicinity of the teeth along with the rotation of the rotor. Particularly, minute fluctuation of the spatial magnetic flux is thought to become large before and after the end portion of the magnetic pole portion of the rotor passes through the teeth. It is an established theory that the fluctuation of the spatial magnetic flux is generated at a frequency corresponding to the number of teeth, and the eddy-current loss is proportional to the square of a fluctuation frequency. In this respect, with the above configuration, since the covering portion made of a soft magnetic material having a low iron loss factor is provided on the facing surface facing the rotor in each of the teeth, the above configuration is thought to be very effective for reducing the eddy-current loss due to the fluctuation of the spatial magnetic flux and eventually achieving high efficiency.

In a fourth means, each of the teeth has:

a facing end facing the rotor; and a flange portion at the facing end thereof, each of the teeth extending in a circumferential direction of the rotor; and each of the covering portions is configured to cover a facing surface of the facing end and circumferential side surfaces of the flange portion of the corresponding one of the teeth.

With the configuration in which the flange portion is provided at a tip portion on the rotor side in each of the teeth, while an area receiving the magnetic flux in each of the teeth increases to increase interlinkage magnetic fluxes and thereby an output performance is increased, eddy-current loss generation positions are increased because the magnetic flux enters or leaves the side surface portion of the flange portion. In this respect, since the facing surface facing the rotor and the side surface of the flange portion in the circumferential direction are covered with the covering portion in the teeth, it is thought that output increasing effect and eddy-current loss reducing effect can be highly expected.

In a fifth means, the stator core includes a member comprising:

an overlapping portion which has the same planar shape as each steel plate and is arranged to be overlapped on the laminated steel plates, the overlap portion having ends, each of the ends of the overlap portion serving as a part of the corresponding one of the teeth; and extension portions each extending from a corresponding one of the ends of the overlapping portion in a laminating direction of the steel plates;

the member is made of a soft magnetic material having a lower iron loss factor than each steel plate; and each of the extension portions constitutes a corresponding one of the covering portions.

With the above configuration, the overlapping portion which has the same planar shape as the steel plate and is arranged by being overlapped on the steel plate and the extension portion extending in the laminating direction of the steel plate at a tip portion of a portion corresponding to each of the teeth are integrally provided, and the integrated member is used, therefore the covering portion can be suitably provided by the extension portion in the stator core.

In a sixth means, each of the covering portions is configured to cover at least a part of at least one side surface of the corresponding one of the teeth, the at least one side surface extending in a radial direction of the rotor.

When current flows through the stator winding, a reaction magnetic flux is generated around a conductor in a slot, and there is a risk of generation of eddy-current loss due to the reaction magnetic flux. In such a case, it is possible to reduce the eddy-current loss due to a magnetic flux flow crossing the teeth by covering a circumferential side face of each of the teeth with the covering portion.

In a seventh means, each of the teeth has a first end closer to the rotor and a second end opposite to the first end;

each of the covering portions comprises a side portion that covers the at least one side surface of the corresponding one of the teeth;

the side portion of each of the covering portions comprises a first part located at the first end of the corresponding one of the teeth, and a second part located at the second end of the corresponding one of the teeth; and each of the first and second parts has a thickness in the circumferential direction of the rotor, the thickness of the first part being different from the thickness of the second part.

In the stator core, the iron loss of AC magnetic flux is generated at a tooth tip portion on the rotor side, and the iron loss of reaction magnetic flux by a conductor current is generated in a tooth side surface portion. Under the premise, a side-surface covering portion of the tooth is made thicker toward a side facing the rotor. In this case, the iron loss reduction of AC magnetic flux at the tooth tip portion and the iron loss reduction of reaction magnetic flux in the tooth side surface portion can be achieved.

In an inner rotor type rotary electric machine in which a rotor is arranged on an inner circumferential side and a stator is arranged on an outer circumferential side, in each of the teeth, it is preferable that a circumferential width is made narrower toward a side facing the rotor, and a covering portion on a tooth side surface is made thicker toward a side facing the rotor. In this case, since the circumferential width of the tooth is made narrower toward the tip side, even if the covering portion is made thicker toward the tooth tip side, it is possible to suppress the width of the radial inner side of the slot from becoming excessively narrow.

In an eighth means, the converging portion of each of the teeth is composed of a magnetic power member that comprises:

iron-silicon-based alloy particles; and insulation layers each covering a corresponding one of the iron-silicon-based alloy particles.

With the above configuration, since the insulating layer serving as an electrical resistance can be formed in units of particle in an alloy while using an iron-silicon based alloy that is a base material having a comparatively high permeability, it is possible to reduce the eddy-current loss while maintaining a magnetic flux density. In addition, because of the compressed molding of the powder, flexibility in shape is ensured, and the covering portion is suitably applied to a selective position, such as being applied only to the tip of the tooth.

In a ninth means, the rotor is provided with a pole covering portion for each of the magnetic pole portions, and the pole covering portion for each of the magnetic pole portions is made of a soft magnetic material having a lower iron loss factor than each steel plate, the pole covering portion for each of the magnetic pole portions covering at least a part of a surface of the corresponding one of the pole magnetic portions.

In a rotary electric machine, there is concern that the eddy-current loss is generated also on a magnetic pole surface (that is, a surface facing the stator) of the rotor. Therefore, at least a part of the surface of the magnetic pole portion in the rotor is preferably covered with the covering portion made of a soft magnetic material having a lower iron loss factor than the steel plate.

In a tenth means, the stator core comprises, as the teeth, two teeth per magnetic pole portion and per phase in the stator core.

An embodiment will be described below with reference to drawings. A rotary electric machine in the present embodiment is used, for example, as a vehicle power source. However, the rotary electric machine is capable of being widely used for an industrial machine, a vehicle, a home appliance, an office automation equipment, a game machine, or the like. Note that, in each embodiment described below, portions identical or equivalent to each other will be labelled with the same code in the drawing and explanation of the portion having the same code is applied.

Figure 1:
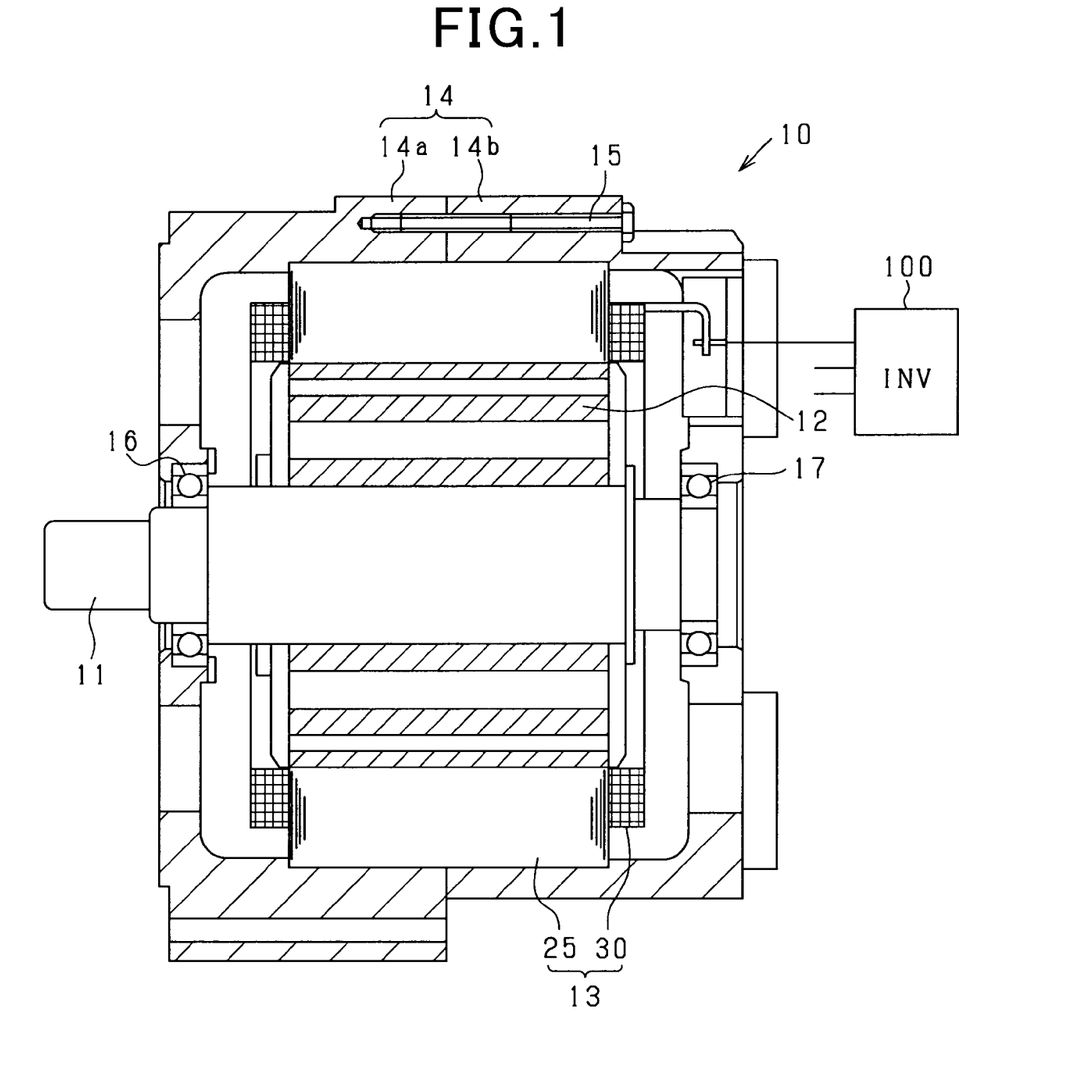
FIG. 1 is a longitudinal section view of a rotary electric machine.
Figure 2:
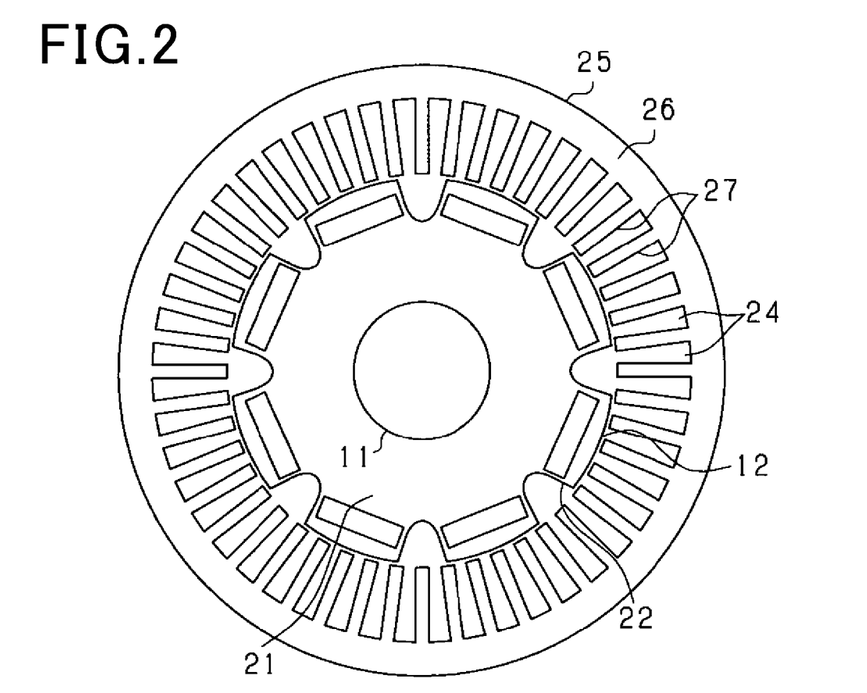
FIG. 2 is a cross-section view showing a rotor and a stator core.

A rotary electric machine 10 according to the present embodiment is an inner rotor type (inner rotation type) multi-phase AC motor, and its overview will be shown in FIGS. 1 and 2. FIG. 1 is a longitudinal section view in a direction along a rotary shaft 11 of the rotary electric machine 10, and FIG. 2 is a cross-section view of a rotor 12 and a stator 13 in a direction orthogonal to the rotary shaft 11. In the following description, a direction in which the rotary shaft 11 extends is a shaft direction, a direction radially extending with the rotary shaft 11 as a center is a radial direction, and a direction circumferentially extending with the rotary shaft 11 as a center is a circumferential direction.

The rotary electric machine 10 includes the rotor 12 fixed to the rotary shaft 11, the stator 13 provided at a position surrounding the rotor 12, and a housing 14 housing the rotor 12 and the stator 13. The rotor 12 and the stator 13 are arranged coaxially. The housing 14 has a pair of bottomed cylindrical housing members 14a, 14b, and the housing members 14a, 14b are integrated by fastening of a bolt 15 with the openings thereof joined together. The housing 14 is provided with bearings 16, 17, and the bearings 16, 17 rotatably support the rotary shaft 11 and the rotor 12.

The rotor 12 has a rotor core 21, and a plurality of magnetic pole portions 22 are provided in a circumferential direction at an outer circumferential portion (that is, on a side radially facing an inner circumferential portion of the stator 13) of the rotor core 21. The rotor core 21 is formed by axially laminating a plurality of electromagnetic steel plates and fixing them by caulking or the like. The magnetic pole portions 22 each have a permanent magnet and are arranged in the circumferential direction at a predetermined interval so that their polarities are alternately different from each other. The number of magnetic poles 12 is eight in the present embodiment but is not limited to that number. The permanent magnet may be a rare earth magnet or a ferrite magnet, and the cross-sectional shape of the magnet may be an arc-like shape, or a V-shape, in addition to a rectangular parallelepiped shape. Further, the magnetic pole portion 22 is not limited to an embedded magnet type but may be a surface magnet type having a permanent magnet arranged on the magnetic pole surface.

The stator 13 includes an annular stator core 25 having a plurality of slots 24 in a circumferential direction and a 3-phase (U phase, V phase, W phase) stator winding 30 wound by distributed winding in each slot 24 of the stator core 25 (the stator winding 30 is omitted in FIG. 2). The stator core 25 is formed by axially laminating a plurality of annular electromagnetic steel plates and fixing them by caulking or the like. The stator core 25 has an annular yoke 26 and a plurality of teeth 27 protruding radially inward from the yoke 26 and arranged in a circumferential direction at a predetermined distance, and each of the slots 24 is formed between the corresponding adjacent pair of the teeth 27. The respective teeth 27 are provided at equal intervals in the circumferential direction. Each slot 24 has an opening shape extending with the radial direction of the stator core 25 as a longitudinal direction. Note that a configuration may be adopted in which the respective teeth 27 are provided at unequal intervals in the circumferential direction.

The number of slots 24 formed in the stator core 25 is in a ratio of two per phase of the stator winding 30 with respect to the number of magnetic poles (8 poles) of the rotor 12. In the present embodiment, the number of slots is 48 according to 8×3×2=48. The 48 slots 24 include the U phase slots, V phase slots, and W phase slots each arranged in twos repeatedly in the circumferential direction.

In each slot 24, the stator winding 30 is wound so as to be wound around the tooth 27. The stator winding 30 is formed, for example, by joining a plurality of conductor segments to one another.

In a drive system that drives the rotary electric machine 10, an inverter 100 that adjusts energization current for each phase is connected to the stator winding 30 of each phase. The inverter 100 is a bridge circuit having as many upper and lower arms as the number of phases of the phase winding, and each arm is provided with a switch (semiconductor switching element). In the inverter 100, for example, based on a power running torque command value or a power generation voltage command value, each switch is turned on/off at a predetermined switching frequency (carrier frequency), and thereby a feedback control is performed for each phase current of the rotary electric machine 10.

Meanwhile, in the present embodiment, to increase an output efficiency of the rotary electric machine 10, covering portions 40, each of which is made of a soft magnetic material having a lower iron loss factor than each electromagnetic steel plate, are provided to the stator core 25. Each of the covering portions 40 covers at least a part of the surface of a corresponding one of the teeth 27.

Figure 3:
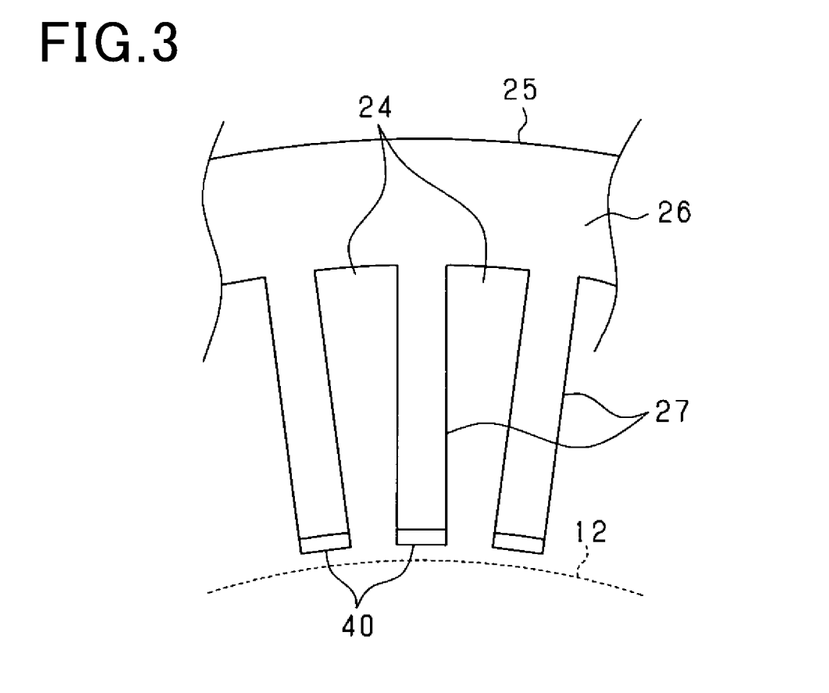
FIG. 3 is a plan view showing a configuration of a teeth part.

FIG. 3 shows a configuration of a part of the teeth 27 in the stator core 25. Each of the teeth 27 is formed so as to protrude radially inward from the yoke 26, and each covering portion 40 is provided at a tip, i.e. a closer tip to the rotor 12, of the corresponding one of the teeth 27 to cover the surface of the tip of the corresponding one of the teeth 27. The covering portion 40 is a plate-like member formed by compression molding of a magnetic powder member that is comprised of iron-silicon-based alloy particles, and insulation layers each covering a corresponding one of the iron-silicon-based alloy particles. Then, the plate-like member is joined to a steel plate laminated portion by an epoxy base adhesive agent or the like to form the covering portion 40 at the tooth tip surface. In FIG. 3, the thickness of each covering portion 40 is uniform in the circumferential direction.

Here, a gap is provided between adjacent teeth at respective tooth tip portions of the stator core 25, and with such a configuration, when the magnetic flux enters and leaves the stator core 25 while rotating, the magnetic resistance changes according to the positional relation between the magnetic pole portion 22 and the teeth 27. This causes the higher density portions and lower density portions of a spatial magnetic flux distribution to occur in the vicinity of the teeth 27 along with rotation of the rotor 12.

Figure 4A:
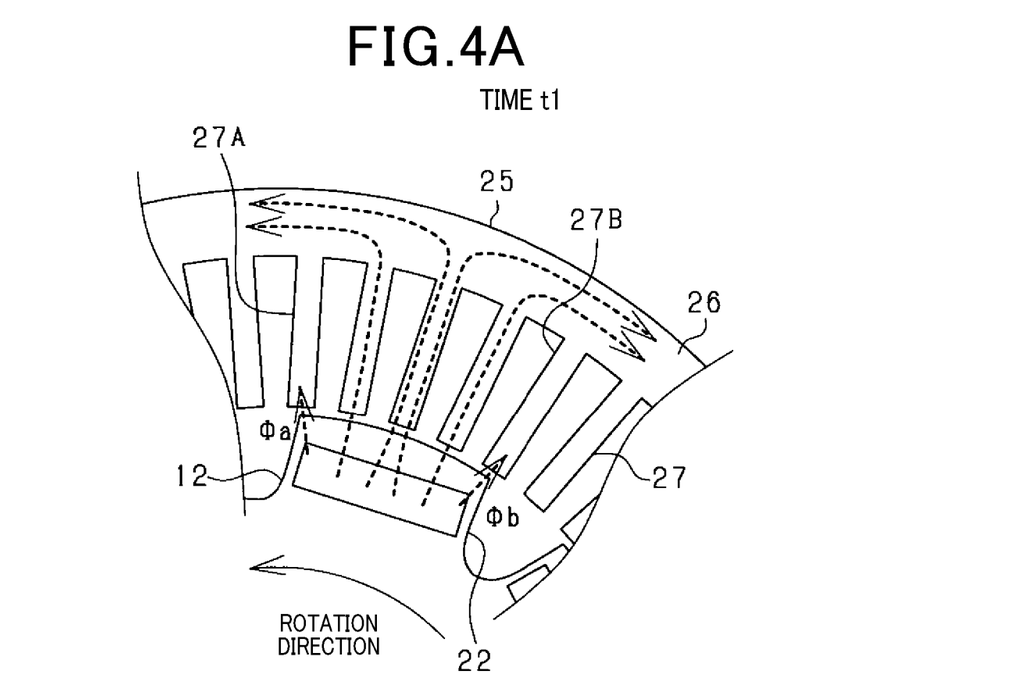
FIG. 4A and FIG. 4B are diagrams for explaining a magnetic flux change near teeth along with rotation of the rotor.

In particular, minute fluctuations of the spatial magnetic flux may be generated before and after the end portions of each magnetic pole portion 22 of the rotor 12 passes through each of the teeth 27. This will be supplemented by use of FIGS. 4A and 4B. FIG. 4A shows a magnetic-flux generation state in the vicinity of the teeth at time t1, and FIG. 4B shows a magnetic-flux generation state in the vicinity of the teeth at time t2 immediately after the time t1.

When a focused magnetic pole portion 22 is provided in the position shown in FIG. 4A, main magnetic fluxes pass through teeth 27 located to face the magnetic pole portion 22 and flow as shown by a large loop arrow as illustrated. In addition, a magnetic flux Φa flows from one end of the magnetic pole portion 22 to a facing end of a tooth 27A of the teeth 27, and a magnetic flux Φb flows from the other end of the magnetic pole portion 22 to a facing end of a tooth 27B of the teeth 27.

Figure 4B:
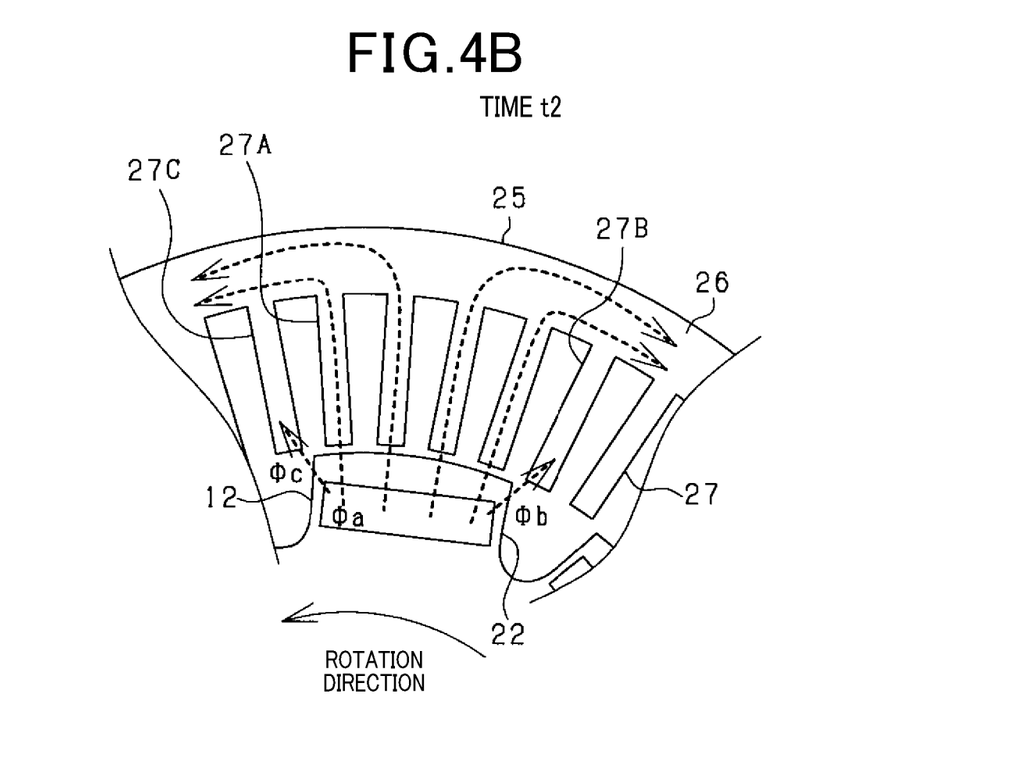

Then, when the time shifts from the time t1 to the time t2, as shown in FIG. 4B, while the magnetic flux Φa of the tooth 27A is increased by movement of the magnetic pole portion 22 along with rotation of the rotor 12, the magnetic flux Φb of the tooth 27B is attenuated. Further, a magnetic flux Φc is newly generated in a tooth 27C existing forward relative to the tooth 27A in the rotation direction. That is, when viewed from the magnetic pole portion 22 of the rotor, the magnetic flux has transitioned from the tooth 27A to the tooth 27C. In this way, in the stator core 25, the magnetic field of the rotor 12 is sequentially transferred to the teeth 27 arranged in the rotation direction. When the magnetic flux is transferred from one of the adjacent teeth 27 to the other thereof, the magnetic flux is decreased in the gap between the adjacent teeth 27. This causes the higher density portions and lower density portions of the spatial magnetic flux distribution to occur in the vicinity of the teeth 27 along with rotation of the rotor 12.

Fluctuation of the spatial magnetic flux is generated at a frequency corresponding to the number of teeth 27. For example, since 48 fluctuations are generated per rotation in the stator 13 having 48 teeth, if the rotary electric machine 10 is operated at 1000 rpm, its fluctuation frequency reaches 800 Hz. At 2000 rpm, it reaches 1600 Hz which is high frequency. It is an established theory that the eddy-current loss is proportional to the square of a frequency of magnetic flux fluctuation.

Figure 5A:
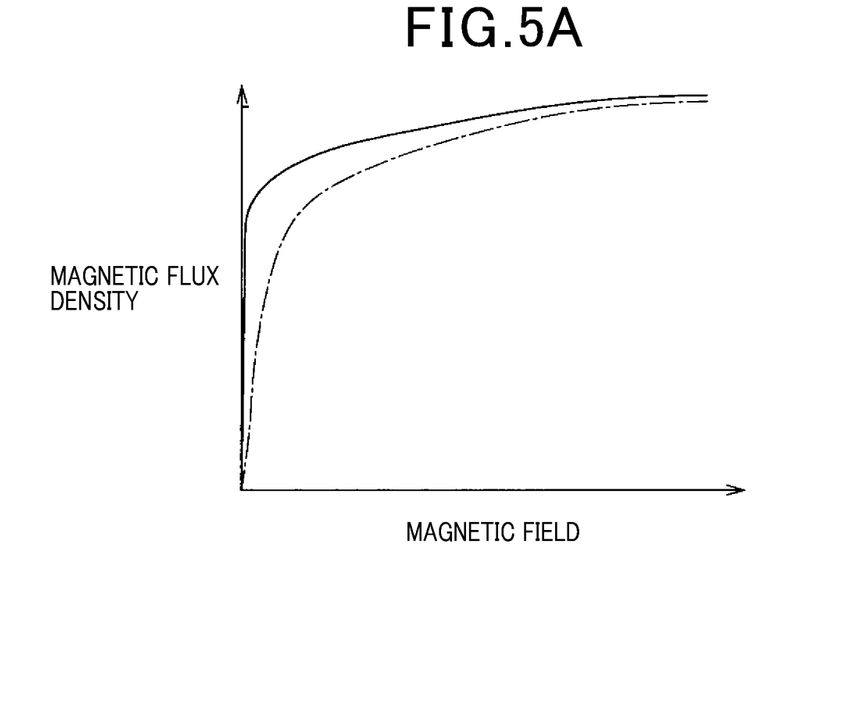
FIG. 5A is a diagram showing a B-H characteristic.

In the present embodiment, each of the covering portions 40 made of magnetic powder obtained by covering iron-silicon based alloy particles with the insulating layer is provided on the surface of a corresponding one of the tooth 27, and the magnetic powder has a very small eddy-current loss because the eddy current straddling a grain boundary is blocked by the insulating layer and is a low iron-loss material due to reduction of the eddy-current loss. With respect to the magnetic powder used in the present embodiment and an electromagnetic steel plate having a thickness of 0.35 mm, FIG. 5A shows a B-H characteristic and FIG.

Figure 5B:
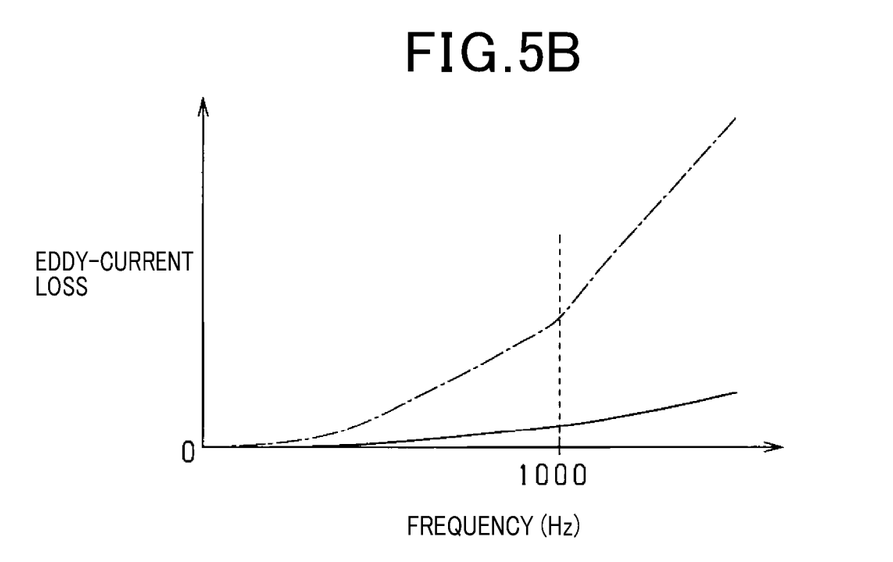
FIG. 5B is a diagram showing a relation between a fluctuation frequency and an eddy-current loss.

5B shows a relation between a fluctuation frequency and an eddy-current loss. In FIG. 5, the solid line is a characteristic of the magnetic powder and the dashed line is a characteristic of the electromagnetic steel plate. According to FIG. 5, in the magnetic powder, for example, the eddy-current loss at 1000 Hz is reduced to about one-fifth that of the electromagnetic steel plate.

From the above, it can be said that provision of each of the covering portions 40 made of a soft magnetic material having a lower iron loss factor than each stator core steel plate at the tip portion of a corresponding one of the teeth 27 can contribute to high efficiency of the rotary electric machine 10 very effectively. Note that, since it is an established theory that the eddy-current loss is proportional to the square of a fluctuation frequency of spatial magnetic flux, it is thought that the eddy-current loss increases in geometric progression along with rise in a rotation speed to cause temperature rise. Therefore, cooling capacity needs to be ensured. In this respect, with the configuration in which the tooth tip portion is covered with the magnetic powder which is a low iron loss material as described above, since the eddy-current loss is reduced, it is also possible to simplify the cooling configuration.

Figure 6:
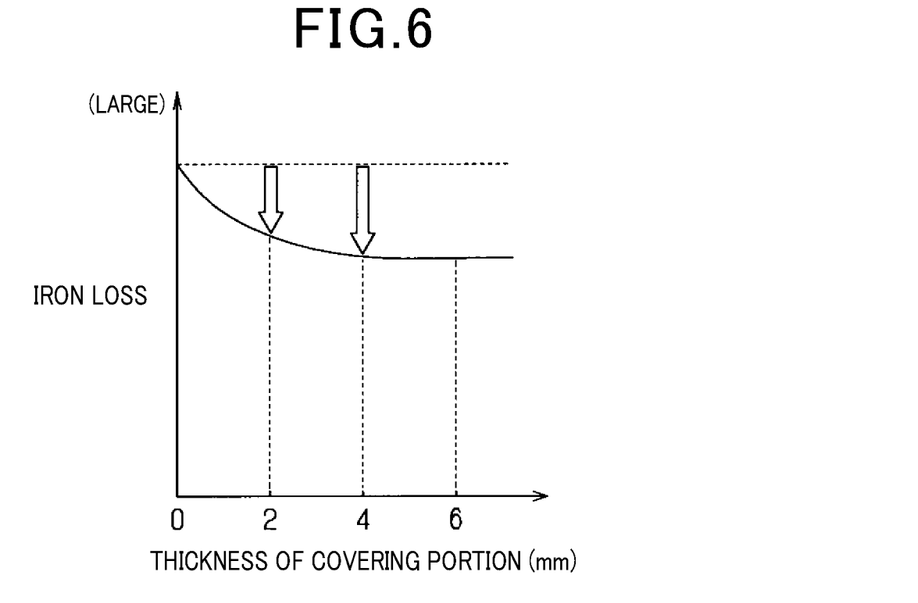
FIG. 6 is a diagram showing a result of iron loss analysis.

FIG. 6 shows a result of analyzing iron loss by changing a thickness of the covering portion 40. A target motor to be analyzed is an inner rotation type IPM motor with 8 poles and 48 slots in which a stator core outer diameter is about 210 mm and a core axis length is about 50 mm, and the result of FIG. 6 is obtained by driving the motor with a sine-wave current. The rotation speed is 1500 rpm, the fundamental frequency is 1000 Hz, and the slot ripple frequency is 12 kHz. The energization current is about 150 Arms, and the generated shaft torque is about 160 Nm. Compared with a case where the covering portion 40 is not provided, it is confirmed that the iron loss is reduced by about 80 W when the thickness of the covering portion 40 is set to 2 mm, and the iron loss is reduced by about 100 W when the thickness of the covering portion 40 is set to 4 mm.

Figure 7:
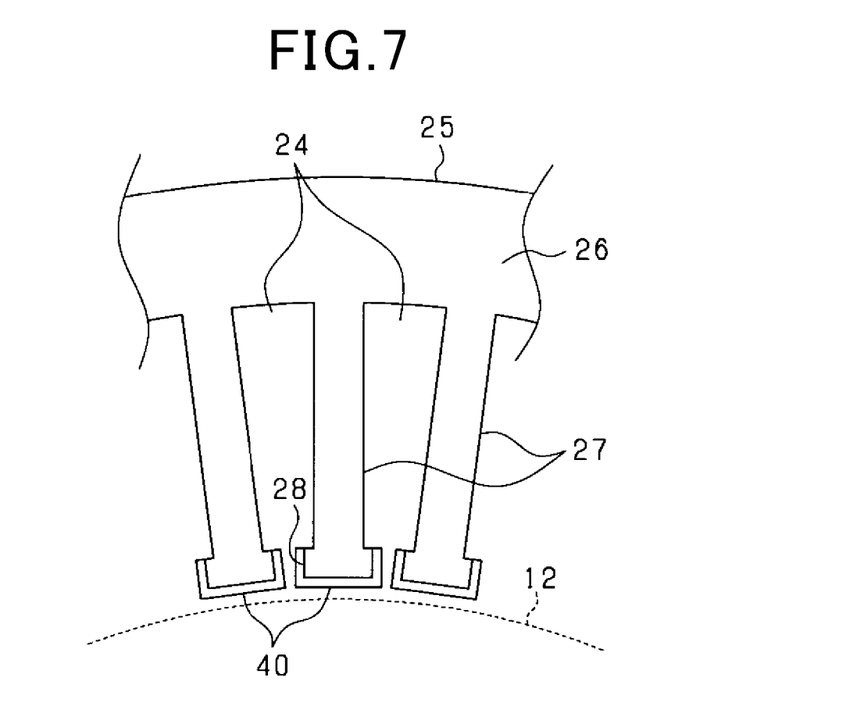
FIG. 7 is a plan view of a configuration of the teeth part.

As shown in FIG. 7, the stator core 25 may be configured to provide each flange 28 at the tip portion of the corresponding one of the teeth 27 as a flange portion extending in a circumferential direction. In this case, it is configured such that each covering portion 40 covers the tip surface of the corresponding one of the teeth 27 and the circumferential side surface of the corresponding one of flanges 28.

With a configuration in which each flange 28 is provided at the tip portion of the corresponding one of teeth 27, since a facing area with the rotor 12 increases in the teeth 27, the area receiving the magnetic fluxes increases to increase interlinkage magnetic fluxes, and thereby output performance is increased. However, on the other hand, eddy-current loss generation positions are increased because the magnetic flux enters and leaves the side surface portion of the flange 28. In this respect, since the tip surface of the corresponding one of teeth 27 and the circumferential side surface of each flange 28 are covered with each covering portion 40, the eddy-current loss is reduced.

Figure 8A:
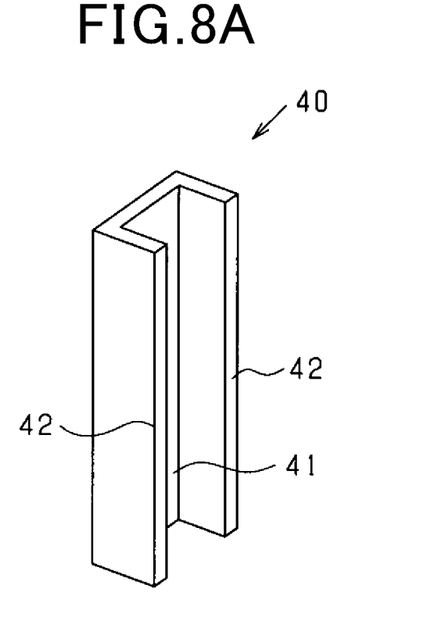
FIG. 8A and FIG. 8B are perspective views respectively showing a configuration of a covering portion.
Figure 8B:
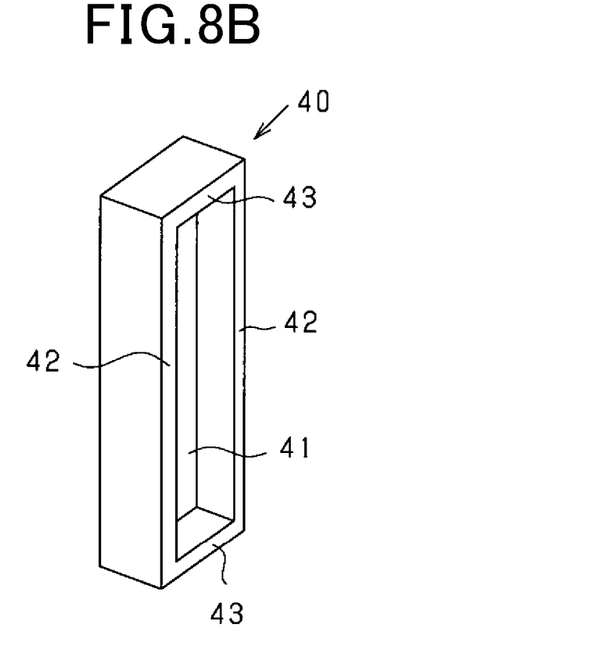

The covering portion 40 is preferably configured, for example, as shown in FIGS. 8A and 8B. In FIG. 8A, the covering portion 40 has a tip covering portion 41 that covers the tip surface of the tooth 27 and side surface covering portions 42 that extend in directions orthogonal to the tip covering portion 41 (in the radially outer direction) and cover the circumferential side surface of the flange 28. In FIG. 8B, the covering portion 40 has, in addition to the tip covering portion 41 and the side surface covering portions 42, axis surface covering portions 43 that extend in directions orthogonal to the respective covering portions 41, 42 (in directions becoming a radial outside) and cover the axial side surface of the flange 28.

Each covering portion 40 shown in FIGS. 8A and 8B is made of a soft magnetic material having a lower iron loss factor than each steel plate like the already described configuration, and specifically the covering portion 40 is a member formed by compression of molding a magnetic powder that is comprised of iron-silicon-based alloy particles, and insulation layers each covering a corresponding one of the iron-silicon-based alloy particles. In this case, each of the covering portions 40 may be assembled to the corresponding one of teeth 27 by joining using an adhesive agent or the like or by fitting. Note that, each covering portion 40 shown in FIGS. 8A and 8B is applicable also to a tooth 27 having no flange 28.

Figure 9:
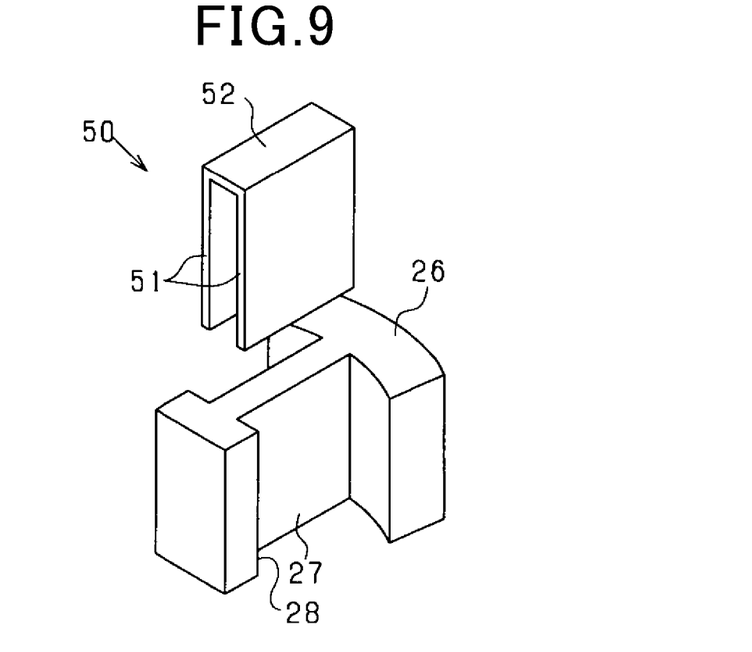
FIG. 9 is a perspective view showing a tooth and a covering portion.

As shown in FIG. 9, a configuration may be adopted in which the circumferential side surfaces are covered with each covering portion 50 in the corresponding one of teeth 27. Each covering portion 50 has a pair of side surface covering portions 51 that cover the circumferential side surfaces of the corresponding one of teeth 27 and a connecting portion 52 that connects the pair of side surface covering portions 51 to each other at one end side in the axial direction. The covering portion 50 is made of a soft magnetic material having a lower iron loss factor than each steel plate like the already described configuration, and specifically the covering portion 50 is a member formed by compression molding of a magnetic power member that is comprised of iron-silicon-based alloy particles, and insulation layers each covering a corresponding one of the iron-silicon-based alloy particles. The covering portion 50 is preferably attached to each tooth 27 from the axial direction. Note that, the covering portion 50 may have a configuration in which a plate-like member is used, and the member is joined to the both circumferential side surfaces of the tooth 27.

Figure 10:
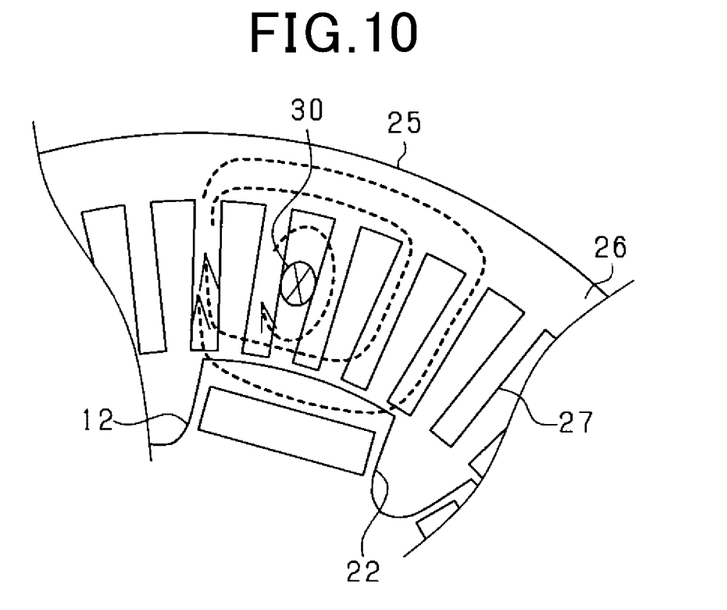
FIG. 10 is a diagram for explaining a reaction magnetic flux crossing the teeth.

When the rotary electric machine 10 is operated, there is a risk that a reaction magnetic flux is generated on the stator 13 side along with energization to the stator winding 30, and eddy-current loss occurs due to the reaction magnetic flux. In this case, particularly, when so-called field weakening control is performed in a high rotation speed region, a non-negligible amount of eddy-current loss due to the reaction magnetic flux on the stator 13 side may be generated. A magnetic flux flow generated by energization of the stator winding 30 will be described with reference to FIG. 10. In FIG. 10, in a state in which a current flows through the stator winding 30, a reaction magnetic field is generated circularly corresponding to the direction of the current, the reaction magnetic field is stronger closer to a conductor in the energization state, and the magnetic flux flow is also increased. In this case, the magnetic flux close to the conductor does not reach the rotor 12 but crosses the other teeth 27 and slots 24 to form a loop. That is, since the magnetic flux penetrates perpendicularly from the side surface of the tooth 27, the eddy-current loss is generated on the tooth side surface.

In this respect, it is possible to reduce the eddy-current loss by the magnetic flux flow crossing the teeth 27 by covering the circumferential side surfaces of the teeth 27 with the covering portion 50 as shown in FIG. 9. Note that, in the rotary electric machine 10, it is possible to adopt both or one of the configuration in which the covering portion 40 is provided at the tip portion of the tooth 27 as shown in FIG. 3 or FIG. 7 and the configuration in which the covering portion 50 is provided on the side surface of the tooth 27 as shown in FIG. 9.

According to the present embodiment described above in detail, the following excellent effects can be obtained.

In the above configuration, at least a part of the surface of the tooth 27 in the stator core 25 is covered with the covering portion 40 made of a soft magnetic material having a lower iron loss factor than each steel plate, as it were, covering with the soft magnetic material having a low iron loss factor is performed only on the surface portion of the tooth 27 where iron loss is easily generated in the stator core 25. In this case, it is possible to effectively reduce the iron loss, particularly the eddy-current loss without disturbing the main magnetic flux of the rotor 12 and the reaction magnetic flux of the stator winding 30. In addition, compared with the case in which the whole of the stator core 25 is made of a low iron loss material, increase in size of the stator core 25 can be suppressed. As a result, an iron loss can be effectively reduced without increase in size of a device.

Since a configuration is adopted in which the covering portion 40 is provided on a facing surface (tooth tip surface) facing the rotor 12 in the tooth 27, iron loss reduction of the AC magnetic flux passing between the tooth tip surface and the rotor 12 radially facing each other can be suitably achieved.

With a configuration in which a gap is provided between the tip portions of the respective teeth 27 in the stator core 25, minute fluctuation of the spatial magnetic flux is thought to increase. In this respect, since the covering portion 40 is provided on the facing surface facing the rotor 12 in the tooth 27, the provision of the covering portion 40 is thought to be very effective for reducing the eddy-current loss due to the fluctuation of the spatial magnetic flux, and furtherly for achieving high efficiency.

In addition, since a configuration is adopted in which the covering portion 40 covers the tip surface of the tooth 27 and the circumferential side surface of the flange 28, it is strongly anticipated that output increase and eddy-current loss reduction can be obtained.

Furthermore, since a configuration is adopted in which the covering portion 40 covers the circumferential side surface of the tooth 27, the eddy-current loss by the magnetic flux flow crossing the teeth 27 can be reduced.

The covering portion 40 is configured by molding using, as the soft magnetic material, the magnetic powder that is obtained by covering iron-silicon based alloy particles with an insulating layer. This makes it possible to form the insulating layer serving as an electrical resistance on each particle in the alloy while using a base material having a comparatively high magnetic permeability, such as an iron-silicon based alloy, and therefore it becomes possible to reduce the eddy-current loss while maintaining the magnetic flux density. In addition, because of the compressed molding of the powder, shape flexibility is ensured, and the covering portion can be suitably applied to a selective position, such as being applied only to the tip of the tooth 27.

Another Embodiment

The above-described embodiment may be modified as follows, for example.

The following configuration may be used as a covering portion that covers the surface of a tooth 27. A stator core 25 shown in FIG. 11A has a steel plate laminating portion 61 formed by laminating a plurality of steel plates and an assembling member 62 integrally assembled to the steel plate laminating portion 61. The assembling member 62 includes an overlapping portion 63 having the same planar shape as the steel plate (steel plate laminating portion 61) and arranged overlapped with the steel plate, and an extension portion 64 extending in a laminating direction of the steel plate at a tip portion of a portion corresponding to a tooth 27 in the overlapping portion 63. The assembling member 62 is a thin plate member made of a soft magnetic material having a lower iron loss factor than each steel plate of the steel plate laminating portion 61, and specifically, as described above, the assembling member 62 is a member formed by compression molding of a magnetic power member that is comprised of iron-silicon-based alloy particles, and insulation layers each covering a corresponding one of the iron-silicon-based alloy particles.

Figure 11A:
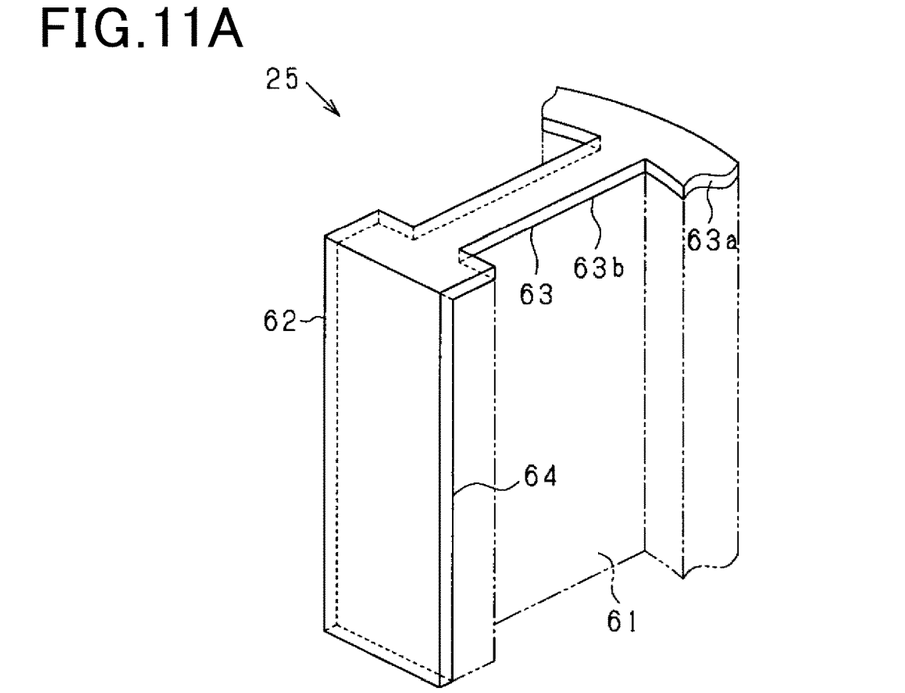
FIG. 11A and FIG. 11B are perspective views respectively showing a configuration of the stator core using an assembly member.

The overlapping portion 63 has the same shape as the yoke portion and the tooth portion in the steel plate laminating portion 61. The extension portion 64 is formed so as to extend from the inner circumferential side end portion of the overlapping portion 63 to one side in the vertical direction, and the extension portion 64 constitutes the covering portion. Note that, a configuration may be adopted in which assembling members 62 are assembled to both axial ends of the steel plate laminating portion 61.

Figure 11B:
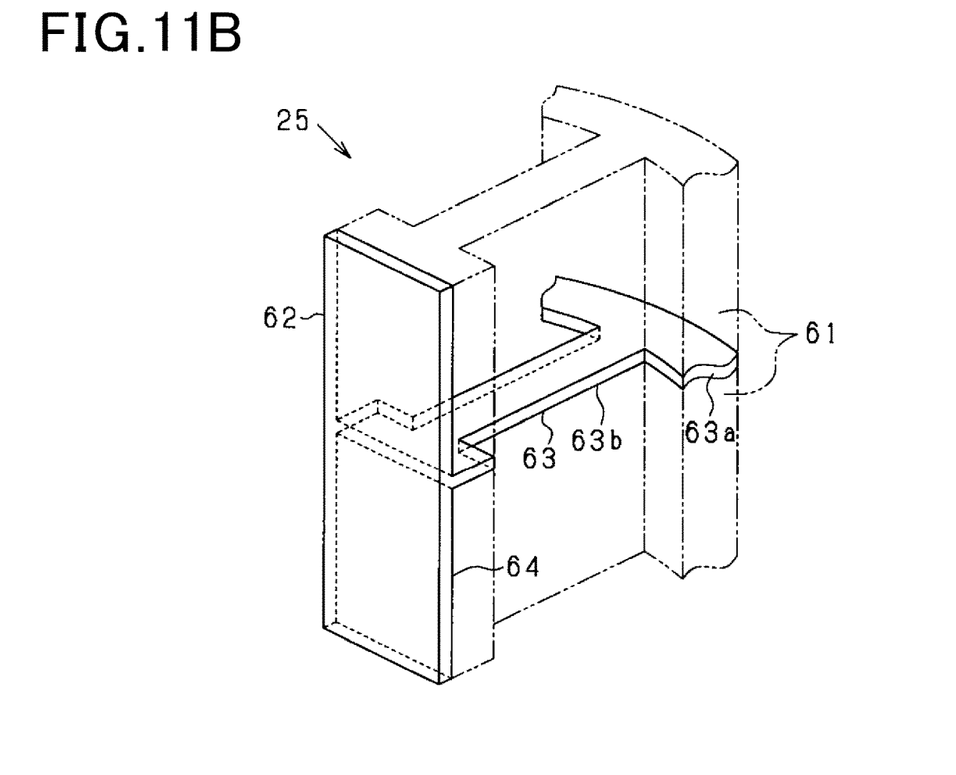

The assembling member 62 may be configured as shown in FIG. 11B. In FIG. 11B, the extension portion 64 is formed so as to extend from the inner circumferential side end portion of the overlapping portion 63 to both sides in the vertical direction. In this case, a pair of steel plate laminating portions 61 are integrated on both sides of the overlapping portion 63. That is, the assembling member 62 is assembled in a state of being sandwiched between one pair of steel plate laminating portions 61.

In each of the above configurations, the overlapping portions 63 are laminated together with a plurality of steel plates, the assembling member 62 is integrated with the steel plate laminating portion 61 by the lamination, and therefore the covering portion (extension portion 64) can be suitably provided on the tip surface of the tooth 27.

In the configuration of providing the covering portion 40 on the tip surface of the tooth 27 (refer to FIG. 3), in place of the configuration of providing the covering portion 40 so as to cover whole of the tip surface, a configuration of providing the covering portion 40 so as to cover part of the tip surface may be adopted. For example, the covering portion 40 may be provided only at both circumferential end portions on the tip surface of the tooth 27, or the covering portion 40 may be provided only at both axial end portions on the tip surface of the tooth 27.

In the configuration (refer to FIG. 9) of providing the covering portion 50 on the circumferential side surface in the tooth 27, in place of the configuration of providing the covering portion 50 so as to cover the whole of the side surface, a configuration of providing the covering portion 50 so as to cover part of the side surface may be adopted. For example, the covering portion 50 may be provided only at a portion close to a radially inner circumference on the side surface of the tooth 27, or the covering portion 50 may be provided only on one of both side surfaces of the tooth 27.

Figure 12:
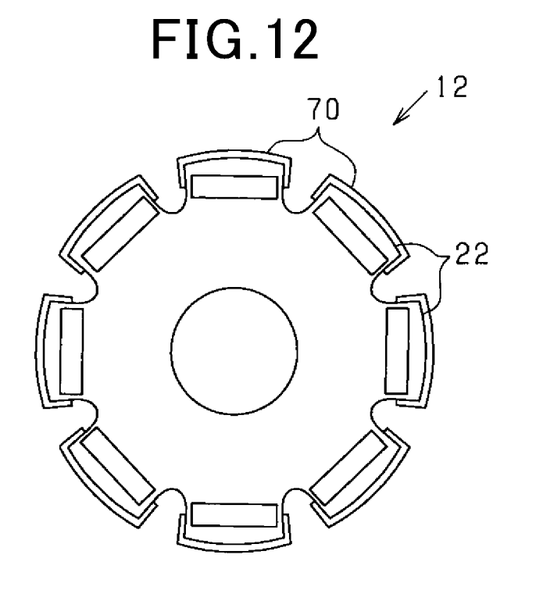
FIG. 12 is a plan view showing a configuration of the rotor.

In the rotary electric machine 10, there is a concern that eddy-current loss may be generated also on the magnetic pole surface (that is, a surface facing the stator 13) of the rotor 12. For this reason, as shown in FIG. 12, at least a part of the surface of the magnetic pole portion in the rotor 12 is preferably covered with a covering portion 70 made of a soft magnetic material having a lower iron loss factor than each steel plate. The covering portion 70, as in the already described configuration, is preferably a member formed by compression molding of a magnetic power member that is comprised of iron-silicon-based alloy particles, and insulation layers each covering a corresponding one of the iron-silicon-based alloy particles. Note that, the covering portion 70 is preferably provided on whole or part of the magnetic pole surface of the rotor 12.

Particularly, in an embedded magnet type rotary electric machine in which a laminated iron core is exposed to a surface, a synchronous reluctance type rotary electric machine in which a magnet is not used, an induction motor including a cage-type conductor, and the like, it is known that an eddy-current loss is generated on a rotor surface. For this reason, providing the covering portion on the magnetic pole surface of the rotor 12 is as effective as providing the covering portion on the tooth 27 of the stator core 25. Note that, since it can be thought that the eddy-current loss is generated on the surface of a permanent magnet also in the rotor in which the permanent magnet is exposed to the surface, the surface of the permanent magnet is preferably covered with a low iron loss material.

Figure 13A:
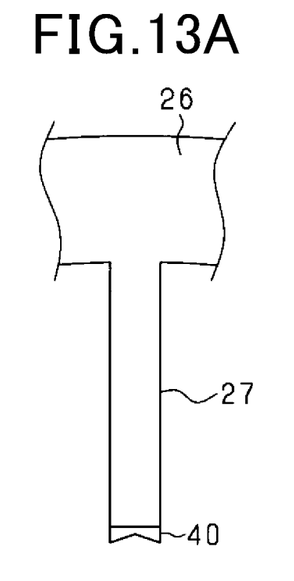
FIG. 13A, FIG. 13B, and FIG. 13C are plan views respectively showing a configuration of tooth in another example.
Figure 13B:
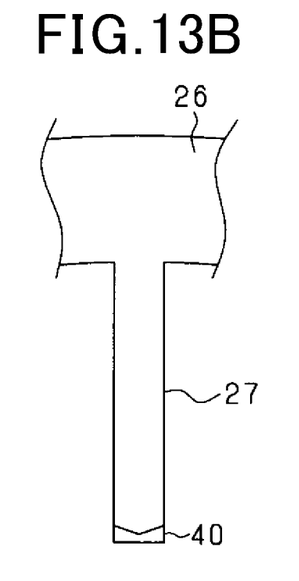

The thickness of the covering portion 40 may be non-uniform in the circumferential direction on the tooth tip surface. In this case, for example as shown in FIGS. 13A and 13B, a portion near each corner portion in the circumferential direction in the tooth 27 is preferably made thicker than a middle portion in the circumferential direction. In FIG. 13A, the covering portion 40 having a non-uniform thickness is provided on the tooth tip surface that is a flat surface, and in FIG. 13B, the covering portion 40 having a non-uniform thickness is provided on the tooth tip surface that is a convex surface raised in the middle portion. In FIG. 13B, a surface facing the rotor 12 in the covering portion 40 is a flat surface.

Figure 13C:
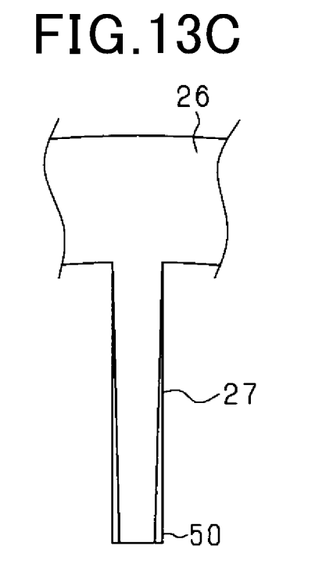

As shown in FIG. 13C, the thickness of the covering portion 50 provided on the side surface of the tooth 27 may be made different between the inner side and the outer side in the radial direction and may be made thicker toward the side facing the rotor 12.

In the stator core 25, the iron loss of the AC magnetic flux is generated in the tooth tip portion on the rotor 12 side, and the iron loss of the reaction magnetic flux due to the conductor current is generated in the tooth side surface portion. Under the premise, the thickness of the covering portion 50 of the tooth side surface is made thicker toward the tooth tip side (side facing the rotor 12). In this case, iron loss reduction of the AC magnetic flux at the tooth tip portion and iron loss reduction of the reaction magnetic flux at the tooth side surface portion can be achieved.

Note that, in an inner rotor type rotary electric machine 10, it is preferable that the circumferential width of the tooth 27 is made narrower toward a side facing the rotor 12, and the thickness of the covering portion 50 of the tooth side surface is made thicker toward a side facing the rotor 12. In this case, since the circumferential width of the tooth is made narrower toward the tip side, even if the thickness of the covering portion is made thicker toward the tooth tip side, it is possible to suppress the width of the radial inner side of the slot from becoming excessively narrow.

In the stator core 25, a configuration may be adopted in which the end portion on the radial inner side i.e. the rotor 12 side of the tooth 27 is closed in the circumferential direction. That is, the slot 24 may be a closed slot in which a slot end portion on the core inner circumferential side is closed by the tooth tip portion.

The rotary electric machine 10 may be an outer rotor type (outer rotation type) in which the rotor 12 is arranged on the outer circumferential side and the stator 13 is arranged on the inner circumferential side, in addition to the inner rotor type (inner rotation type) in which the rotor 12 is arranged on the inner circumferential side and the stator 13 is arranged on the outer circumferential side.

As the rotary electric machine 10, the cage-type conductor can be also applied to an induction motor. In addition, it can be also applied to a rotary electric machine of a claw-pole winding field type, a salient pole reluctance type, or a magnetic modulation reluctance type. Furthermore, it can be also applied to a rotary electric machine having so-called concentrated winding, such as 8 poles-12 slots and 10 poles-12 slots. It can be also applied to a 6-phase AC motor in addition to a 3-phase AC motor.

It can be also applied to a passive power generator. That is, it can be also applied to a rotary electric machine in which full-wave rectification by diodes (rectifying elements) is performed, such as a vehicle alternator.

It should be understood that the present disclosure is written according to the example but is not limited to the example or the structure. The present disclosure also includes various variations and modifications within an equivalent range. In addition, various combinations and forms and other combinations and forms including only one element, more than that or less than that are also included in a category and a conceptual range of the present disclosure.

What is claimed is:

1. A rotary electric machine, comprising:
a rotor that is rotatably supported, and includes a plurality of magnetic pole portions in a circumferential direction thereof; and
a stator that is coaxially arranged with the rotor and includes a stator core including a stator winding wound in the stator core, a multi-phase alternating current being supplied to flow through the stator winding, wherein:
the stator core is configured based on a plurality of laminated steel plates and includes an annular yoke and a plurality of teeth extending in a radial direction from the yoke,
the stator winding is configured such that a conductor is distributedly wound in the stator core for each of the magnetic pole portions,
each of the teeth is provided with a covering portion, and
the covering portion of each of the teeth is made of a soft magnetic material having a lower iron loss factor than each steel plate,
the covering portion of each of the teeth covering at least a part of a surface of the corresponding one of the teeth.

2. The rotary electric machine according to claim 1, wherein
the stator core comprises, as the teeth, two teeth per magnetic pole portion and per phase in the stator core.

3. The rotary electric machine according to claim 1, wherein
each of the teeth has a facing surface facing the rotor; and
each of the covering portions is configured to cover at least a part of the facing surface of the corresponding one of the teeth.

4. The rotary electric machine according to claim 1, wherein
the stator core has gaps each provided between a corresponding adjacent pair of the teeth, each gap being located at respective ends of the teeth of the corresponding pair;
each of the teeth has a facing surface facing the rotor; and
each of the covering portions is configured to cover at least a part of the facing surface of the corresponding one of the teeth.

5. The rotary electric machine according to claim 1, wherein
each of the teeth has:
a facing end facing the rotor; and
a flange portion at the facing end thereof, each of the teeth extending in a circumferential direction of the rotor; and
each of the covering portions is configured to cover a facing surface of the facing end and circumferential side surfaces of the flange portion of the corresponding one of the teeth.

6. The rotary electric machine according to claim 1, wherein
the stator core includes a member comprising:
an overlapping portion which has the same planar shape as each steel plate and is arranged to be overlapped on the laminated steel plates, the overlap portion having ends, each of the ends of the overlap portion serving as a part of the corresponding one of the teeth; and
extension portions each extending from a corresponding one of the ends of the overlapping portion in a laminating direction of the steel plates;
the member is made of a soft magnetic material having a lower iron loss factor than each steel plate; and
each of the extension portions constitutes a corresponding one of the covering portions.

7. The rotary electric machine according to claim 1, wherein
each of the covering portions is configured to cover at least a part of at least one side surface of the corresponding one of the teeth, the at least one side surface extending in a radial direction of the rotor.

8. The rotary electric machine according to claim 7, wherein
each of the teeth has a first end closer to the rotor and a second end opposite to the first end;
each of the covering portions comprises a side portion that covers the at least one side surface of the corresponding one of the teeth;
the side portion of each of the covering portions comprises a first part located at the first end of the corresponding one of the teeth, and a second part located at the second end of the corresponding one of the teeth; and
each of the first and second parts has a thickness in the circumferential direction of the rotor,
the thickness of the first part being different from the thickness of the second part.

9. The rotary electric machine according to claim 1, wherein
the converging portion of each of the teeth is composed of a magnetic power member that comprises:
iron-silicon-based alloy particles; and
insulation layers each covering a corresponding one of the iron-silicon-based alloy particles.

10. The rotary electric machine according to claim 1, wherein:
the rotor is provided with a pole covering portion for each of the magnetic pole portions, and
the pole covering portion for each of the magnetic pole portions is made of a soft magnetic material having a lower iron loss factor than each steel plate,
the pole covering portion for each of the magnetic pole portions covering at least a part of a surface of the corresponding one of the pole magnetic portions.

* * * * *